United States Patent
Deiss et al.

(10) Patent No.: US 9,762,868 B2
(45) Date of Patent: Sep. 12, 2017

(54) HIGHLIGHTING AN OBJECT DISPLAYED BY A PICO PROJECTOR

(71) Applicant: THOMSON LICENSING, Issy les Moulineaux (FR)

(72) Inventors: Michael Scott Deiss, Zionsville, IN (US); Mark Alan Schultz, Billings, MO (US); James Edwin Hailey, Indianapolis, IN (US)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 14/900,289

(22) PCT Filed: Jun. 28, 2013

(86) PCT No.: PCT/US2013/048533
§ 371 (c)(1),
(2) Date: Dec. 21, 2015

(87) PCT Pub. No.: WO2014/209352
PCT Pub. Date: Dec. 31, 2014

(65) Prior Publication Data
US 2016/0205365 A1     Jul. 14, 2016

(51) Int. Cl.
*H04N 9/31* (2006.01)
*H04N 5/74* (2006.01)

(52) U.S. Cl.
CPC ......... *H04N 9/3179* (2013.01); *H04N 5/7441* (2013.01); *H04N 9/3155* (2013.01); *H04N 9/3173* (2013.01); *H04N 9/3182* (2013.01)

(58) Field of Classification Search
CPC .... G02B 26/10; G02B 26/101; G02B 26/123; H04N 9/3129; H04N 9/3132; H04N 9/3179; H04N 9/3182
See application file for complete search history.

(56) References Cited

U.S. PATENT DOCUMENTS 5,400,093 A   3/1995   Timmers
5,428,417 A   6/1995   Lichtenstein
(Continued)

FOREIGN PATENT DOCUMENTS

CN   101853125   10/2010
CN   201965398 U   9/2011
(Continued)

OTHER PUBLICATIONS

EPSON, "Projector EPSON EMP-735", Images of the projector EPSON EMP-735 including images of the projected graphical user interface, Dec. 31, 2010, pp. 1-3.
(Continued)

*Primary Examiner* — Sultan Chowdhury
(74) *Attorney, Agent, or Firm* — Brian J. Dorini; Patricia A. Verlangieri (57) ABSTRACT

An apparatus and method for projecting an image on a surface is provided. More specifically, the method for highlighting information within an image displayed by a projection unit includes receiving a video signal; decoding the video signal; controlling a panel driver to drive a light engine within a predefined power range to display the video signal; and causing the panel driver to enter an overdrive mode driving the light engine at a power level above the preset power range for a period of a scan of the video signal at which information to be highlighted is displayed.

9 Claims, 4 Drawing Sheets

(56) References Cited

U.S. PATENT DOCUMENTS

| | | | |
|---|---|---|---|
| 5,614,961 A * | 3/1997 | Gibeau | G02B 26/10 |
| | | | 348/203 |
| 5,721,602 A | 2/1998 | Narayan et al. | |
| 5,739,890 A | 4/1998 | Uda et al. | |
| 5,745,184 A | 4/1998 | Neal | |
| 5,777,713 A | 7/1998 | Kimura | |
| 5,870,164 A | 2/1999 | Lu et al. | |
| 5,883,687 A | 3/1999 | Lu et al. | |
| 5,905,535 A | 5/1999 | Kerdranvat | |
| 6,069,405 A | 5/2000 | Stockton | |
| 6,096,985 A | 8/2000 | Ritter et al. | |
| 6,097,442 A | 8/2000 | Rumreich et al. | |
| 6,181,398 B1 | 1/2001 | Libsch et al. | |
| 6,292,246 B1 | 9/2001 | Shinohara et al. | |
| 6,346,933 B1 | 2/2002 | Lin | |
| 6,362,922 B2 | 3/2002 | Tadic-Galeb et al. | |
| 6,434,097 B1 | 8/2002 | Lewis et al. | |
| 6,490,018 B1 | 12/2002 | Taira | |
| 6,618,076 B1 | 9/2003 | Sukthankar et al. | |
| 6,781,650 B1 | 8/2004 | Colgan et al. | |
| 6,825,836 B1 | 11/2004 | Stewart et al. | |
| 7,050,030 B2 | 5/2006 | Willis | |
| 7,191,402 B2 | 3/2007 | Kim et al. | |
| 7,272,236 B2 | 9/2007 | Nicholson et al. | |
| 7,347,564 B2 | 3/2008 | Matsumoto et al. | |
| 7,363,042 B2 | 4/2008 | Lipovski | |
| 7,494,226 B2 | 2/2009 | Barnes et al. | |
| 7,495,400 B2 | 2/2009 | Testin | |
| 7,632,185 B2 | 12/2009 | Solomon et al. | |
| 7,717,569 B2 | 5/2010 | Sokeila et al. | |
| 7,781,990 B2 | 8/2010 | Huang et al. | |
| 7,822,269 B2 | 10/2010 | Tsukada | |
| 7,835,730 B2 | 11/2010 | Boss et al. | |
| 7,933,017 B2 | 4/2011 | Blonde et al. | |
| 8,210,688 B2 | 7/2012 | Izumida | |
| 8,217,887 B2 | 7/2012 | Sangam et al. | |
| 9,219,923 B2 * | 12/2015 | Pandit | H04N 19/597 |
| 2003/0038928 A1 | 2/2003 | Alden | |
| 2005/0173703 A1 | 8/2005 | Lebrun | |
| 2006/0043254 A1 | 3/2006 | Wang et al. | |
| 2006/0099945 A1 | 5/2006 | Helvick | |
| 2007/0046829 A1 | 3/2007 | Su et al. | |
| 2007/0115435 A1 * | 5/2007 | Rosendaal | H04N 5/74 |
| | | | 353/30 |
| 2008/0088807 A1 | 4/2008 | Moon et al. | |
| 2008/0291403 A1 | 11/2008 | Kameta | |
| 2009/0015548 A1 | 1/2009 | Tazaki et al. | |
| 2009/0015791 A1 | 1/2009 | Chang et al. | |
| 2009/0257030 A1 | 10/2009 | Klosowiak et al. | |
| 2010/0093332 A1 | 4/2010 | Chen | |
| 2010/0222046 A1 | 9/2010 | Cummings | |
| 2010/0289727 A1 * | 11/2010 | Miller | G09G 3/2003 |
| | | | 345/76 |
| 2010/0304719 A1 | 12/2010 | Deep | |
| 2010/0304722 A1 | 12/2010 | Tanaka | |
| 2011/0050985 A1 | 3/2011 | Munoz Leo | |
| 2011/0075101 A1 | 3/2011 | Sato et al. | |
| 2011/0115823 A1 | 5/2011 | Huebner | |
| 2011/0157245 A1 | 6/2011 | Young | |
| 2011/0167081 A1 | 7/2011 | Kosaka et al. | |
| 2011/0193982 A1 | 8/2011 | Kook et al. | |
| 2011/0261274 A1 | 10/2011 | Shiue et al. | |
| 2012/0013857 A1 | 1/2012 | Yoshikawa et al. | |
| 2012/0014593 A1 | 1/2012 | Jaynes et al. | |
| 2012/0026376 A1 | 2/2012 | Goran | |
| 2012/0057132 A1 | 3/2012 | Roder et al. | |
| 2012/0062586 A1 | 3/2012 | Wang | |
| 2012/0062856 A1 | 3/2012 | Wang | |
| 2012/0113514 A1 | 5/2012 | Rodman | |
| 2012/0147337 A1 | 6/2012 | Matsumoto et al. | |
| 2012/0206698 A1 * | 8/2012 | Hino | G03B 21/2026 |
| | | | 353/85 |

FOREIGN PATENT DOCUMENTS

| | | |
|---|---|---|
| EP | 627849 A1 | 12/1994 |
| EP | 0773676 A2 | 5/1997 |
| EP | 1613100 A2 | 1/2006 |
| EP | 1650966 A2 | 4/2006 |
| EP | 2584403 A2 | 4/2013 |
| JP | 2003057743 | 2/2003 |
| JP | 2004200912 | 7/2004 |
| JP | 200537771 | 2/2005 |
| JP | 2006025244 | 1/2006 |
| JP | 2006109380 | 4/2006 |
| JP | 200765608 | 3/2007 |
| JP | 2007121632 | 5/2007 |
| JP | 2008134378 | 6/2008 |
| JP | 2008181044 | 8/2008 |
| JP | 2009008932 | 1/2009 |
| JP | 2009081616 | 4/2009 |
| JP | 2009186646 | 8/2009 |
| JP | 04454288 | 4/2010 |
| JP | 2011138019 | 7/2011 |
| JP | 2011172049 | 9/2011 |
| JP | 2011242823 | 12/2011 |
| JP | 2012095355 | 5/2012 |
| JP | 05004946 | 8/2012 |
| KR | 866882 | 11/2008 |
| WO | WO99035854 | 7/1999 |
| WO | WO03003463 | 1/2003 |
| WO | WO2006115852 | 11/2006 |
| WO | WO2007002143 | 1/2007 |
| WO | WO2007085081 | 8/2007 |
| WO | WO2008112405 | 9/2008 |
| WO | WO2012145200 | 10/2012 |

OTHER PUBLICATIONS

Son, Jung-Young, et al. "Distortion analysis in stereoscopic images." Optical Engineering vol. 41, No. 3 680-5 (Mar. 2002).

Cai, Dawei. "Projector Correction Approach for Unknown Geometry Surface." WSEAS Transaction on Circuits and Systems vol. 2, No. 4 pp. 759-765 (Oct. 2003).

ISR for International Application No. PCT/US2013/048533 mailed Aug. 26, 2013.

ISR for Related International Application No. PCT/US2013/048537 mailed Aug. 21, 2013.

ISR for Related International Application No. PCT/US2013/048523 mailed Jan. 2, 2014.

ISR for Related International Application No. PCT/US2013/048538 mailed Aug. 22, 2013.

ISR for Related International Application No. PCT/US2013/048528 mailed Sep. 25, 2013.

Bogaert, Lawrence, et al. "Single projector multiview displays: directional illumination compared to beam steering." Proceedings of the SPIE—The International Society for Optical Engineering vol. 7524 75241R (10 pp.) (2010).

Son, Chang-Hwan, and Yeong-Ho Ha. "Color correction of images projected on a colored screen for mobile beam projector." Journal of Imaging Science and Technology vol. 52, No. 3 030505-1-11 (May 2008).

Zhang, Ying, and Adrian Travis. "A projection-based multi-view time-multiplexed autostereoscopic 3D display system." Information Visualization, 2006. IV 2006. Tenth International Conference on. IEEE (Jan. 2006).

Kim, Kyoungjae, and Jinsoo Cho. "Clipping error rate-adaptive color compensation based on gamut extension for a low-performance camera in a projector-camera system." IEEE Transactions on Consumer Electronics vol. 57, No. 3 1010-17 (Aug. 2011).

Shen, S. C., Y. J. Wang, and M. T. Shih. "A novel dual-screen projection system using a balance-type micromirror with a piezo-electric actuator." Transducers 2011—2011 16th International Solid-State Sensors, Actuators and Microsystems Conference (2011).

(56) References Cited

OTHER PUBLICATIONS

Sugimoto, et al., "Projecting Displays of Mobile Devices Based on 3D Positions and Intuitive Manipulation Techniques," Trans of the Inf Process Society of Japan, vol. 47, No. 6 1976-1985 (Jun. 2006).

* cited by examiner

HIGHLIGHTING AN OBJECT DISPLAYED BY A PICO PROJECTOR

This application claims the benefit, under 35 U.S.C. §365 of International Application PCT/US2013/048533, filed Jun. 28, 2013, which was published in accordance with PCT Article 21(2) on Dec. 31, 2014 in English.

FIELD

The present arrangement provides a system and method for controlling the operation of a portable projection device and, more particularly to highlighting an object within an image being displayed by the portable projection device.

BACKGROUND

Conventionally, projection devices were (and are) designed as non-mobile devices that are positioned in a room and project a series of audio-visual images on a screen that is viewable by individuals within the room and in the line of sight of the projected image. To ensure projection quality and an optimal viewing experience for the individuals, these projection devices are precisely configured to minimize errors in the audio-visual images being displayed. Examples of these systems include but are not limited to movie theaters, professional meeting rooms, lecture halls and the like.

However, the rapid miniaturization of electronic devices has also extended to projection devices. Currently, there exists a portable electronic projection device that may be easily transported and able to turn virtually any room into a projection room. These portable electronic projection devices are termed pico projectors. A pico projector may be included in any handheld device that can selectively project at least one of an image or series of images on a surface. Moreover, it is important for the pico projector to be able to generate a clear image of sufficient quality on any type of surface. This may include, for example, a conventional display screen or a wall in a room. It is, therefore, necessary for the pico projector to compensate for any surface impurities when generating and projecting a display image.

Moreover, a further drawback associated with pico projection relates to the nature of the device itself. Because the pico projector is naturally handheld and/or portable, the pico projector suffers from increased visual display errors as compared to a traditional projection device. The increased visual errors (e.g. noise, distortion, etc) in images projected by pico projectors result from the often sub-optimal positioning of the pico projector with respect to the surface on which the images are being displayed as well as the orientation of individuals viewing the image to the surface on which the image is displayed.

Additionally, as pico projectors are increasingly being embodied in multi-function devices, activities associated with functions other than the projection of images may interrupt, distort and/or otherwise affect the image being projected by the pico projector and/or the experience of the individuals viewing the projected images. An example of these drawbacks is present in a multi-function portable electronic device that, in addition to being a pico projector, is also a portable communication device (e.g. smartphone). Various call and message functionality associated with the portable communication device may interfere with the functionality of the pico projector embodied in the multifunction portable electronic device.

Furthermore, at times it is helpful to a user of a projector to highlight elements or objects within an image being displayed by a pico projector in order to assist with an explanation of the displayed image or the subject being discussed by the user. With conventional projectors and pico projectors, it is difficult to highlight elements or objects within an image being displayed by a pico projector.

It would therefore be desirable to correct any of the above identified drawbacks associated with pico projectors. A system and method according the present invention addresses these deficiencies.

SUMMARY

In one embodiment, an apparatus for projecting an image on a surface is provided. The apparatus includes a controller for receiving and decoding an image signal representative of the image to be displayed and a light engine for projecting the decoded image signal on a surface. A panel driver is connected to the controller for driving the light engine based on control signals received from the controller. The panel driver operates in a first normal mode that drives the light engine within a preset power range and a second overdrive mode that drives the light engine at a power level above the preset power range during a portion of a scan period causing information displayed during the second overdrive mode to appear highlighted.

In another embodiment, a method for highlighting information within an image displayed by a projection unit is provided. The method includes receiving a video signal, decoding the video signal and controlling a panel driver to drive a light engine within a predefined power range to display the video signal. The panel driver is caused to enter an overdrive mode driving the light engine at a power level above the preset power range for a period of a scan of the video signal at which information to be highlighted is displayed.

In a further embodiment, an apparatus for projecting an image on a surface is provided. The apparatus includes means, such as a controller, for receiving and decoding an image signal representative of the image to be displayed and means, such as a light engine, for projecting the decoded image signal on a surface. A means, such as a panel driver, for driving the means for projecting based on control signals received from the means for receiving and decoding. The means for driving operates in a first normal mode within a preset power range and a second overdrive mode at a power level above the preset power range during a portion of a scan period causing information displayed during the second overdrive mode to appear highlighted.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

To the accomplishment of the foregoing and related ends, certain illustrative aspects of embodiments are described herein in connection with the following description and the annexed drawings. These aspects are indicative, however, of but a few of the various ways in which the principles of the subject matter can be employed, and the subject matter is intended to include all such aspects and their equivalents. Other advantages and novel features of the subject matter can become apparent from the following detailed description when considered in conjunction with the drawings.

DETAILED DESCRIPTION

It should be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

If used herein, the term "component" is intended to refer to hardware, or a combination of hardware and software in execution. For example, a component can be, but is not limited to being, a process running on a processor, a processor, an object, an executable, and/or a microchip and the like. By way of illustration, both an application running on a processor and the processor can be a component. One or more components can reside within a process and a component can be localized on one system and/or distributed between two or more systems. Functions of the various components shown in the figures can be provided through the use of dedicated hardware as well as hardware capable of executing software in association with appropriate software.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein. The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details. In other instances, well-known structures and devices are shown in block diagram form in order to facilitate describing the embodiments.

The present invention is directed towards a multifunction portable electronic device (hereinafter, the "device") that includes audiovisual image projection capabilities (e.g. a pico projector) and method of operating the same. An exemplary block diagram of the device 10 is provided in FIG. 1. The device 10 includes a controller 12. The controller 12 is a component that executes various operational algorithms that control the various functions of the device 10. In one embodiment, the controller 12 executes algorithms that enable audio and video processing of a source input signal. The controller 12 may also include a memory in which various machine executable instructions controlling various device functionality may be stored and accessed as needed in response to various control signals generated by one of (a) a user; and (b) other components of the device 10 as will be discussed below. The memory of the controller 12 may also store data associated with any input signal received by the controller 12. The memory of controller 12 may also store user-specific information that is associated with a user of the device 10. In one embodiment, user specific information may include user preferences for configuring the device for a particular type of operation. The user specific information may include global preference information that configures aspects of device operation that are common between the various functions as well as function specific preference information that configures the device to operate in a particular manner when executing a particular function. While the controller 12 is described as including a memory, one skilled in the art should understand that the memory (or other storage medium) within the device may be a separately embodied component that is read/write accessible by the controller 12 as needed.

Figure 1:
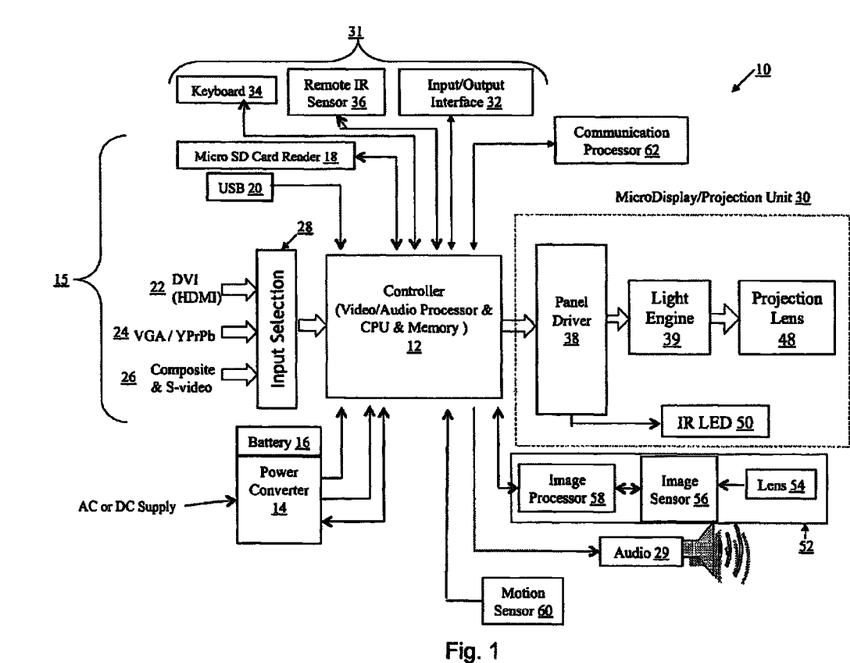
FIG. 1 is a block diagram of the portable projection device according to aspects of the present invention.

The device 10 also includes a power converter 14 and battery 16 connected to the power converter 14. The power converter 14 is selectively connectable to an input power source (either AC or DC) for receiving power therefrom. Power received by the power converter 14 is provided to the battery 16 and selectively charges the battery 16 as needed. It should be understood that the operation of charging is meant to include an initial charging of the battery 16 as well as recharging the battery 16 as the power level is being depleted. Power is also simultaneously provided by the power converter 14 to the controller 12 for powering operation thereof. The controller 12 may selectively detect when input power is being provided by the power converter 14 causing the device 10 to operate in a first power mode when a connection to an input power source is detected and a second mode when no connection to an input power source is detected. In one embodiment of the first power mode, the controller 12 may execute a battery monitoring algorithm that enables the controller 12 to selectively detect a power level in the battery 16 and control the power converter 14 to direct power thereto. The controller 12 can also control charging of the battery 16 when the detected power level in the battery 16 is below a predetermined threshold. In another embodiment of the first power mode, the controller 12 may automatically direct power from the power converter 14 to be provided to the battery 16 in response to connection of the power converter with the input power source. In the second mode of operation, the controller 12 is powered by the battery 16 until such time that the battery power is depleted below a predetermined operational threshold representing a minimum amount of power needed to operate the device.

The controller 12 may receive an input audiovisual signal from one of a plurality of device inputs collectively referred to using reference numeral 15. The controller 12 can control selective projection of the audiovisual input signal using projection unit/microdisplay 30. The input audiovisual signal may include one of (a) a still image; (b) a series of images; (c) a video signal; and (d) an audio signal. The input audiovisual signal may also include an audio component that is intended to be audibly reproduced by speaker 29 in conjunction with the projection, by the projection unit 30, of the one still image or series of images as will be discussed below.

The plurality of inputs may include any combination of but is not limited to (a) a card reader 18; (b) a USB port 20; (c) a digital video input port (HDMI) 22; (d) a VGA/Component video input port 24; and (e) a composite/S-Video input port 26. The depiction of the plurality of input ports 15 is for purposes of example only and the device 10 may include any combination of the described input ports or other known input ports.

The card reader selectively receives a storage card that may include data representative of the input audiovisual signal that is accessed by the controller 12 and provided to the projection unit 30 and/or speaker 29 for output thereof. In one embodiment, the card reader 18 may be a MicroSD card reader. This is described for purposes of example only and any card reading device able to read any standardized storage card may be included in device 10. The USB port 20 enables the device 10 to be selectively connected to one of (a) a portable storage device (e.g. flash drive); or (b) a secondary device, that stores data representative of the audiovisual input signal. Any of the digital video input 22, VGA/component input 24 and/or composite video input 26 may enable connection with a secondary device that includes the source audiovisual input signal and are coupled to the controller 12 via an input selector 28. The input selector 28 selectively couples a respective one of the digital video input 22, VGA/component input 24 and/or composite video input 26 with the controller 12 such that the controller 12 may provide the audiovisual input signal to the projection unit 30 and speaker 29 for output thereof.

The device 10 further includes a plurality of user controls, collectively referred to using reference numeral 31, enabling the user to selectively control various device functions. An input/output (IO) interface 32 may include at least one user selectable button associated with at least one device function such that selection thereof initiates a control signal received by the controller 12 that is used to control the particular device function. In one embodiment, the IO interface 32 may be a touch screen and the at least one button may be a user selectable image element displayed on the touch screen enabling selection thereof by a user. In this embodiment, the number and types of user selectable image elements may be generated by the controller 12 depending on the particular operational mode of the device. For example, during projection mode, the user selectable image elements may enable activation of image projection functionality and, if the device 10 is operating in a communication mode, the user selectable image elements displayed on the IO interface 32 may relate to communication functionality. In another embodiment, the IO interface 32 may include at least one dedicated button on a housing of the device 10 that may be manually activated by a user.

Another user control 31 included with the device 10 includes a keyboard 34. The keyboard 34 enables a user to enter alphanumeric text-based input commands for controlling the operation of the device. In one embodiment, the keyboard is positioned on the housing of the device. In another embodiment, there is no dedicated keyboard and the keyboard may be generated by the controller 12 and provided for display by the IO interface 32.

A further user control 31 that may be provided is a remote infrared (IR) sensor 36. Remote IR sensor 36 selectively receives an IR input signal that is generated by a remote control. The IR input signal received by the remote IR sensor 36 is communicated to the controller 12 which interprets the received IR input signal and initiates operation of a particular function of the device corresponding to user input.

Any of the user controls 32, 34 and/or 36 may be used to generate control signals for selecting an input audiovisual signal from a respective input source of the plurality of input sources 15. The control signals input via the user are received by the controller 12 which processes the user input signal and selects the source of the input audiovisual signal. Input received from any of the user controls 31 may also condition the controller 12 to selectively output the audiovisual signal using projection unit 30 and speaker 29.

Operation of the projection unit 30 will now be discussed. The projection unit 30 may include a microdisplay/pico projection unit. The projection unit 30 includes a panel driver 38, a light engine 39 and a projection lens 48. The panel driver 38 receives the audiovisual input signal from the controller 12 and controls the light engine to emit light representative of the audiovisual input signal that may be projected via a projection lens 48 coupled thereto. The light engine 39 may include a light source and light processing circuitry that is selectively controlled by the panel driver 38 to generate light and project an image representing the audiovisual signal onto a surface. Exemplary types of light engines 39 will be discussed in greater detail with respect to FIGS. 2A-2D. However, persons skilled in the art will understand that any light engine used in any type of projection device (portable or otherwise) may be incorporated in the projection unit 30 of the device 10. In operation, the light generated by the light engine 39 is provided to the projection lens 48 which projects the full color image onto a display surface (e.g. screen, wall, etc). The projection lens 48 may be focused in response to user input received by the controller 12 as needed. Additionally, the operation and position of the various components of the projection unit 30 may be controlled via a control signal that is generated by either the user or another component of device 10.

The projection unit 30 of the device may also include an infrared light emitting diode (IR LED) 50 that is coupled to the panel driver 38. In certain exemplary operations, the controller 12 may generate an IR audiovisual input signal based on the audiovisual input signal received from one of the plurality of inputs 31 or user controls. The IR audiovisual signal may be provided to the panel driver 38 which conditions the IR LED 50 to project an IR version of the audiovisual input signal. The IR signal is imperceptible to the human eye but may be used by other components as an input control signal in the manner discussed below.

The device 10 may also include a camera module 52. The camera module 52 may include a lens 54 coupled to an image sensor 56. Image data received via the lens 54 and sensed by image sensor 56 may be processed by image processor 58. The camera module 52 may operate as a convention digital camera able to capture one of still images and video images. The camera module 52 may also operate as a sensor that senses at least one type of image being displayed and uses the sensed image as a control signal for controlling at least one function of the device 10 as will be discussed below. The lens 54 of the camera module 52, shown in conjunction with the projection lens 48 of the projection unit, is described for purposes of example only and the device may include a single lens that is shared between the projection unit 30 and camera module 52.

A motion sensor 60 is also provided. The motion sensor 60 is coupled to the controller 12 and selectively senses data representing movement of the device 10. The motion sensor 60 may sense the position of the device and generate an input control signal used by the controller 12 for controlling device operation. The motion sensor 60 may include any type of motion sensor including but not limited to a gyroscope and/or an accelerometer. For example, in an embodiment, where the motion sensor 60 includes an accelerometer, the device 10 may include at least three accelerometers positioned on the X, Y and Z axis such that accelerometers may sense the position of the device 10 with respect to gravity. The motion sensor 60 may refer to a plurality of different sensors that are able to sense various types of data which may be provided to the controller 12 for analysis and processing thereof.

The device 10 also includes a communications processor 62 that enables bidirectional communication between the device 10 and a remote device. The communication processor 62 is described generally and is intended to include all electronic circuitry and algorithms that enable bidirectional communication between devices. In one embodiment, the communication processor 62 enables the device to operate as a cellular phone. In another embodiment, the communication processor 62 includes all components and instructions for connecting the device 10 to the internet. In a further embodiment, the communication processor 62 includes all components associated with a smartphone to enable a plurality of different types of bidirectional communication (e.g. telephone, email, messaging, internet, etc) between the device and a communications network.

FIGS. 2A-2D are block diagrams representing different types of light engines 39 that may be employed within the projection unit 30 described in FIG. 1. It should be understood that the portable projection device 10 as discussed herein may utilize any of the different light engines 39a-39d described in FIGS. 2A-2D. It should also be appreciated that the description of the light engines 39a-39d is not limited to those described herein and any type of light engine able to generate and process light into a full color image for display on a surface may be used by the device 10.

Figure 2A:
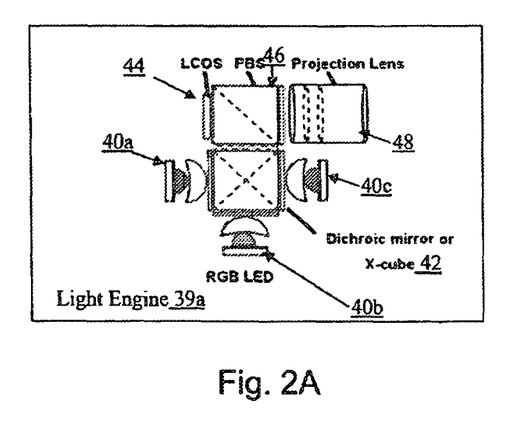
FIG. 2A-2D are exemplary light engines for use in the portable projection device according to aspects of the present invention.

FIG. 2A represents a three-color LED light engine 39a. The light engine 39a is controlled via the panel driver 38 (FIG. 1). The panel driver 38 receives the audiovisual input signal from the controller 12 and controls the operation of light emitting diodes (LED) 40a, 40b, and 40c. The LEDs 40a-c represent three color LEDs including a blue LED 40a, a green LED 40b and a red LED 40c. The audiovisual input signal provided to the panel driver 38 has been separated into its component colors by the controller 12 and the panel driver 38 selectively controls the LEDs 40a-c to emit the necessary light to generate the desired audiovisual image for output. Light generated by the LEDs 40a-c is focused into a full color image by a focusing element 42. In one embodiment, the focusing element 42 may be an x-cube. In another embodiment, the focusing element 42 may be a dichroic mirror. These focusing elements are described for purposes of example only and any focusing element 42 able to combine light from a plurality of LEDs into a single full color image may be used in the projection unit 30.

The focused image is projected on a liquid crystal on silicon (LCOS) chip 44 for receiving light emitted from each of the LEDs 40a-c and optically combines the received light via a polarizing beam splitter 46. The combined light is provided to the projection lens 48 which projects the combined full color image onto a display surface (e.g. screen, wall, etc). The projection lens 48 may be focused in response to user input received by the controller 12 as needed. Additionally, the operation and position of the various components of the projection unit 30 may be controlled via a control signal that is generated by either the user or another component of device 10.

Figure 2B:
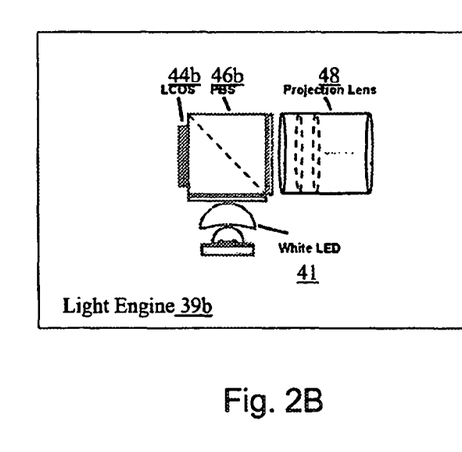

FIG. 2B depicts a white-light LED light engine 39b that may be used in the projection unit of the device 10. Light engine 39b may include a white light LED 41. The panel driver 38 (in FIG. 1) receives the audiovisual input signal from the controller 12 and controls the operation of the white light LED 41. The LED 41 is controlled to emit a pattern of light to generate the desired audiovisual image for output. Light generated by the LED 41 is provided to a LCOS chip 44b. The LCOS chip 44b has a predetermined pattern of primary color dots thereon. The panel driver 38 controls the LCOS chip 44b to have certain of the dots illuminated by the light emitted by LED 41 to provide colored light to the polarizing beam splitter 46b which optically combines the colored light reflected off of the LCOS chip 44b. The combined light is provided to the projection lens 48 which projects the combined full color image onto a display surface (e.g. screen, wall, etc).

Figure 2C:
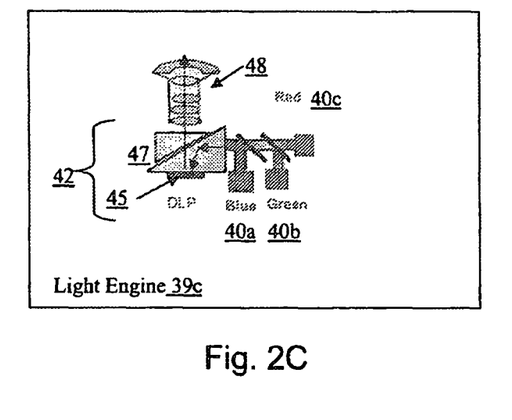

FIG. 2C depicts a digital light processing (DLP) engine 39c. The DLP engine 39c includes three colored light sources 40a, 40b, and 40c. In one embodiment, the light sources 40a-c represent three color LEDs including a blue LED 40a, a green LED 40b and a red LED 40c. While these light sources are described as LED light sources, this is done for purposes of example only and the light sources may be any type of light sources including, but not limited to lasers as are known to be implemented in a DLP light engine. In operation, the light sources 40a-c are not on simultaneously. Rather, the panel driver 38 controls the individual light sources in sequence and the emitted light is provided to the focusing element for producing the full color image. In another embodiment of a DLP engine, a color wheel may be positioned between a light source and the focusing element 42. The panel driver 38 selectively controls the color wheel to rotate to one of the three primary colors based on the data in the audiovisual input signal to illuminate a respective light color at a given time.

The audiovisual input signal provided to the panel driver 38 has been separated into its component colors by the controller 12 and the panel driver 38 selectively controls the LEDs 40a-c to emit the necessary light to generate the desired audiovisual image for output. Light generated by the LEDs 40a-c are projected and focused into a full color image by a focusing element 42. The focusing element 42 may include a mirror unit 45 formed from at least one mirror which reflects the emitted light through prisms 47. The focused image is provided to the projection lens 48 which projects the combined full color image onto a display surface (e.g. screen, wall, etc).

Figure 2D:
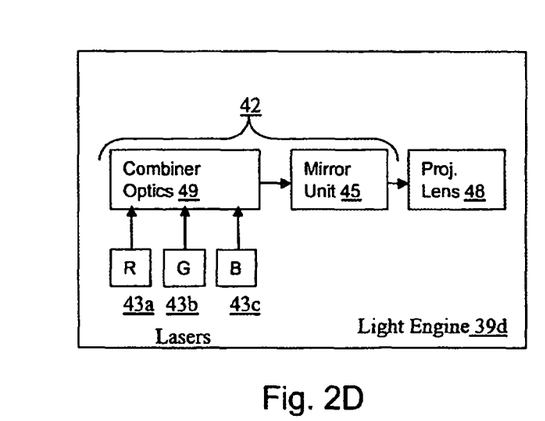

FIG. 2D depicts a laser-based light engine 39d. The laser-based light engine 39d includes light sources 43a-c that each emit a respective color light based on an audiovisual input signal. The light sources 43a-c are lasers that emit light in three distinct wavelengths. For example, light source 43a may be a laser that emits light at a wavelength associated with the color red whereas light source 43b may emit light at a wavelength associated with the color green and light source 43c may emit light at a wavelength associated with the color blue. The panel driver 38 controls the light sources 43a-c to emit respective colored light based on the audiovisual input signal received from the controller 12. The emitted light (either, concurrently or sequentially—depending on the panel driver being used) is provided to a focusing element 42. The focusing element 42 includes a set of combiner optics 49 that receives and combines the emitted laser light and provides the light to the mirror unit 45 including a plurality of individual mirrors. The mirror unit 45 is controlled by the panel driver 38 to rotate the plurality of mirrors based on the audiovisual input signal and reflects light to the projection lens 48 for projection onto a display surface (e.g. screen, wall, etc).

When using the light engines as described in FIGS. 2A-2D or any other light engine that may be used in a projector such as a pico projector as discussed with respect to FIG. 1, it is sometimes helpful and desired to highlight certain information items or elements of an image being displayed. It should be understood that the portable projection device 10 as discussed herein for purposes of accomplishing the objectives of the present invention may utilize any of the different light engines 39a-39d described in FIGS. 2A-2D. It should also be appreciated that the description of the light engines 39a-39d is not limited to those described herein and any type of light engine able to generate and process light into a full color image for display on a surface may be used by the device 10.

Figure 3:
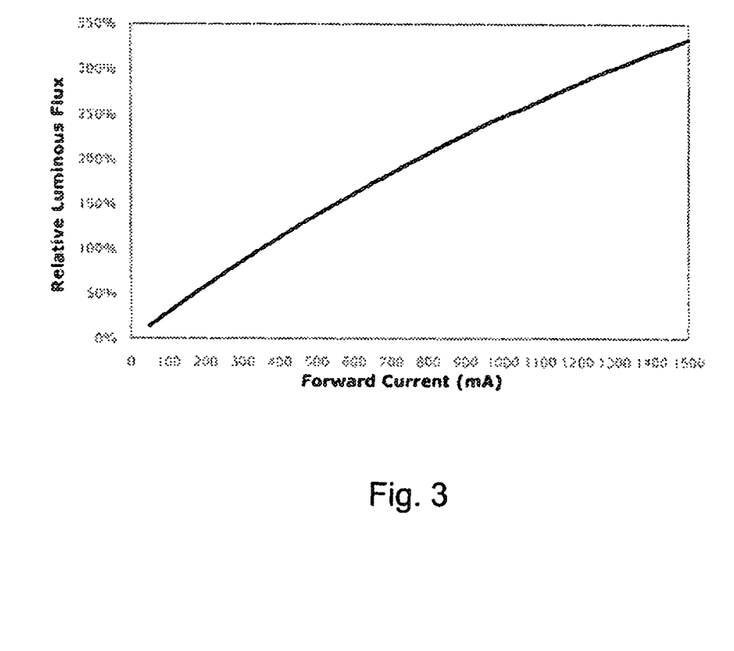
FIG. 3 is an image of a graphical depiction of a lamp for display of an image according to aspects of the present invention.

When conducting a presentation or using a projector to present information to others, the user may find it informative and helpful to highlight certain information elements of images being displayed to emphasize their importance. Light engines used in projection units as shown in FIG. 1 generally operate within a defined power range as depicted in the graph of FIG. 3. FIG. 3 depicts the performance of a specific lamp having a nominal rated continuous current of 350 mA, for which the curve of FIG. 3 shows 100% of luminous flux. However, at the pulsed overdrive level of 300% of max rated continuous current ($\approx$1050 Ma), the luminous flux output is 250% of nominal. The power range for normal operation of a projection unit varies somewhat with drive level and manufacturer. For a white LED, a rough efficiency is 100 lumens per watt. Pico projectors seem to have a luminous flux output as low as 10 lumens to perhaps as much as 300 lumens.

Providing a mode where the average power dissipation is increased momentarily is performed to provide highlighting of certain data. During this special highlighted frame display time, the normal light sources are allowed to increase their power output by a certain amount (e.g. substantially 10%) to make a brighter than normal screen. The normal power constraints should be able to handle the short term excess of power and resulting light increase for this short duration to provide this feature. In order to further highlight certain data within the displayed image, the playing of normal video may be modified by reducing the frame rate of the normal content. This is accomplished by skipping an occasional video frame and substituting the information to be highlighted in place of the skipped video frame.

This feature provides the highlighting in two manners: one by the increase in power used to drive the light source during the display of the highlighted frame, and second by slightly dimming the remaining video due to the non-displayed frames.

The average level of brightness in non-highlighted content decreases in intensity as a factor of the number of video frames skipped out of the total number of frames. To intensify the highlighting, a frame of highlighted material is added in place of the skipped frames to display the highlighted material at normal intensity but brighter than non-highlighted material. These two methods for highlighting of certain data may be performed either concurrently or individually by the device 10 to generate the appearance of highlighting of desired information on the displayed image.

When highlighting an element or object on an image displayed by the projector, the controller 12 will control the panel driver 38 to drive the light engine 39 above the normal operating range associated with the light engine for a period of time during the scan of the raster at which the element or object to be highlighted is being written on the display area. The period of time during which the element or object being highlighted is usually a small portion of the entire scan period and thus any damage to the light engine that may be caused by overdriving the light engine should be minimal over an extended period of time.

Additionally, an light engine driven at the maximum rated continuous current may have little or no margin to be able to dissipate an additional 300% overdrive even at a 10% duty cycle. The continuous current portion of the LED drive level should be reduced in order to accommodate the additional power that comes with pulsed overdrive.

The overdriving of the light engine during the scan of the highlighted element or object will cause an increase in brightness of the element or object thus providing the appearance of highlighting. When combined with skipping of certain frames and replacing the skipped frames with the highlighted information causing the dimming of the remaining portion of the frames provides the effect of highlighting the desired information.

Figure 4:
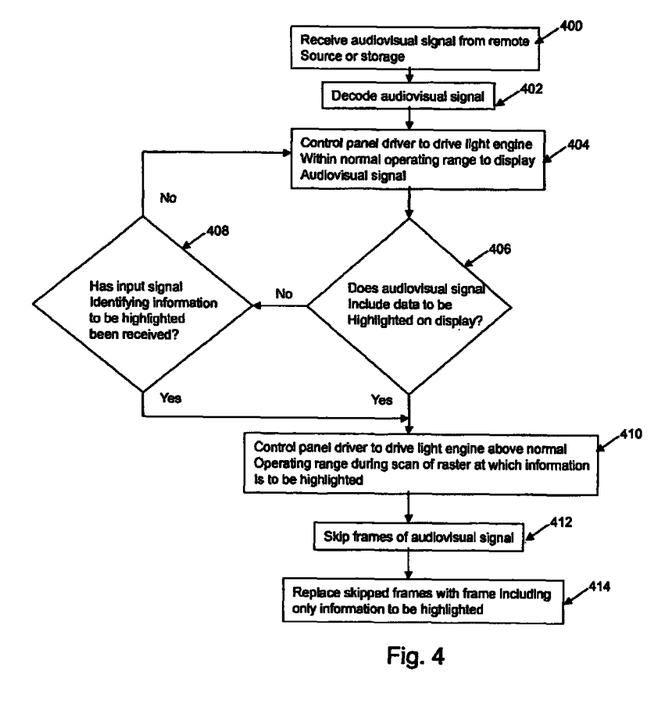
FIG. 4 is a flow chart showing the operation of the device according to aspects of the present invention.

The method of performing the present invention will now be described with reference to FIG. 4. The following description includes the various components from FIG. 1 that are charged with performing the described tasks. The device 10 receives an audiovisual signal from one of the plurality of device inputs 15 including data representative of the image to be displayed as indicated in step 400. The audiovisual signal is provided to the controller 12 where it is decoded in step 402. The controller 12 provides the audio portion of the signal to the speaker 29 and provides the video portion of the received audiovisual signal to the projection unit 30. The controller 12 controls the panel driver 38 to drive the light engine 39 to provide an image signal to the projection lens for display on a screen in step 404. The controller 12 detects whether the audiovisual signal includes a control signal indicating certain information for display should be highlighted in step 406. Additionally, the controller detects whether a highlighting signal is received from any of the user input controls 31 in step 408. If no control signal is detected, the controller continues to control the panel driver to drive the light engine to display the image. When the controller detects a control signal indicative of highlighting within the received audiovisual signal or from any of the user input controls, in steps 406 and 408, with respect to certain information within the displayed image, the controller 12 controls the panel driver 38 to operate in an overdrive mode for the duration of the scan of the information to be highlighted in step 410. The overdrive mode of the panel driver 38 causes the power output of the light sources within the light engine 39 to be increased thereby increasing the brightness for certain information within the audio visual image being projected on the display. When an image is displayed with the light sources being driven to increase their power output for a certain portion of the raster scan, the information being displayed during the period of increased power output will be displayed at brightness level greater than the remaining portion of the displayed image. Additionally, the controller 12 may reduce the frame rate of the video by skipping occasional frames in step 412. Each skipped frame may be replaced by substituting the certain information to be highlighted in step 414. If the controller skips occasional frames of the content being displayed, this acts to dim the display of the content for which the frames are skipped. Replacing the skipped frames with a frame containing the information to be highlighted causes the information to be highlighted to be displayed at a normal brightness with respect to the dimmed remaining information. Thus the information in the replacement frames appears brighter or highlighted as opposed to the information in the skipped frames. When combined with driving the light sources to increase power during select portions of the scan, the information being projected during this portion of the scan will appear highlighted.

The implementations described herein may be implemented in, for example, a method or process, an apparatus, or a combination of hardware and software. Even if only discussed in the context of a single form of implementation (for example, discussed only as a method), the implementation of features discussed may also be implemented in other forms (for example, a hardware apparatus, hardware and software apparatus, or a computer-readable media). An apparatus may be implemented in, for example, appropriate hardware, software, and firmware. The methods may be implemented in, for example, an apparatus such as, for example, a processor, which refers to any processing device, including, for example, a computer, a microprocessor, an integrated circuit, or a programmable logic device. Processing devices also include communication devices, such as, for example, computers, cell phones, tablets, portable/personal digital assistants ("PDAs"), and other devices that facilitate communication of information between end-users.

Additionally, the methods may be implemented by instructions being performed by a processor, and such instructions may be stored on a processor or computer-readable media such as, for example, an integrated circuit, a software carrier or other storage device such as, for example, a hard disk, a compact diskette, a random access memory ("RAM"), a read-only memory ("ROM") or any other magnetic, optical, or solid state media. The instructions may form an application program tangibly embodied on a computer-readable medium such as any of the media listed above. As should be clear, a processor may include, as part of the processor unit, a computer-readable media having, for example, instructions for carrying out a process. The instructions, corresponding to the method of the present invention, when executed, can transform a general purpose computer into a specific machine that performs the methods of the present invention.

What has been described above includes examples of the embodiments. It is, of course, not possible to describe every conceivable combination of components or methodologies for purposes of describing the embodiments, but one of ordinary skill in the art can recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. An apparatus for projecting an image on a surface, the apparatus comprising:
    a controller for receiving and decoding an image signal representative of the image to be displayed;
    a light engine for projecting the decoded image signal on the surface; and
    a panel driver connected to the controller for driving the light engine based on control signals received from said controller, said panel driver operating in a first normal mode that drives the light engine within a preset power range and a second overdrive mode that drives the light engine at a power level above the preset power range during a portion of a scan period causing information displayed during the second overdrive mode to appear highlighted, wherein said controller skips frames of the decoded image signal and replaces the skipped frames with frames including only information to appear highlighted.

2. The apparatus of claim 1, wherein said controller decodes a control signal within the image signal, the control signal instructing said controller to cause said panel driver to operate in said second overdrive mode.

3. The apparatus of claim 1, wherein said controller receives a control signal from a user input device, the control signal instructing said controller to cause said panel driver to operate in said second overdrive mode.

4. A method for highlighting information within an image displayed by a projection unit, said method including:
  receiving a video signal;
  decoding the video signal;
  controlling a panel driver to drive a light engine within a predefined power range to display the video signal;
  causing the panel driver to enter an overdrive mode driving the light engine at a power level above the preset power range for a period of a scan of the video signal at which information to be highlighted is displayed;
  skipping frames of the video signal; and
  replacing the skipped frames with frames including the information to be highlighted.

5. The method of claim 4, further comprising the step of receiving a control signal instructing a controller to cause the panel driver to enter the overdrive mode.

6. The method of claim 4, wherein a control signal is included within the video signal, the control signal causing the panel driver to enter the overdrive mode.

7. An apparatus for projecting an image on a surface, the apparatus comprising:
  means for receiving and decoding an image signal representative of the image to be displayed;
  means for projecting the decoded image signal on the surface; and
  means for driving the means for projecting based on control signals received from said means for receiving and decoding, said means for driving operating in a first normal mode within a preset power range and a second overdrive mode at a power level above the preset power range during a portion of a scan period causing information displayed during the second overdrive mode to appear highlighted, wherein said means for receiving and decoding skips frames of the decoded image signal and replaces the skipped frames with frames including only information to appear highlighted.

8. The apparatus of claim 7, wherein
  said means for receiving and decoding decodes a control signal within the image signal, the control signal instructing said means for receiving and decoding to cause said means for driving to operate in said second overdrive mode.

9. The apparatus of claim 7, wherein
  said means for receiving and decoding receives a control signal from a user input device, the control signal instructing said means for receiving and decoding to cause said means for driving to operate in said second overdrive mode.

* * * * *